Patented May 1, 1934

1,956,553

UNITED STATES PATENT OFFICE 1,956,553

COMPOSITION OF MATTER AND METHOD OF MAKING THE SAME

Arthur D. Atkin, Woodland, Calif.

No Drawing. Application May 23, 1932, Serial No. 613,145

11 Claims. (Cl. 75—62)

My invention relates to a composition of matter and method of making the same, and particularly to a method of treating copper in the production of a new form thereof.

It is among the objects of my invention to provide a method of treating copper which will alter certain physical characteristics of the copper.

Another object of my invention is to provide a form of copper which is softer and tougher than the untreated copper.

Another object of my invention is to provide a form of copper which does not harden or crystallize under working.

Another object of my invention is to provide a form of copper which has a smaller coefficient of thermal expansion than the untreated copper.

Still another object of my invention is to provide a form of copper which may be readily machined.

Another object of my invention is to provide a form of copper which does not scale, and which will take a high glass-like glazed surface in contact with a revolving shaft, as in bearings.

A further object of my invention is to provide a form of copper having the above mentioned characteristics without forming an alloy of the copper.

A more specific object of my invention is to provide a high speed bearing metal having the high melting point of copper yet the softness of nickel babbitt.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In terms of broad inclusion, the preferred form of treating copper embodying my invention comprises melting the copper in the presence of sodium tetraborate, ammonium chloride and sodium chloride. Preferably the latter three substances are placed in a receptacle together with the copper to be treated, and the entire mass is preferably covered with a substance to prevent oxidation of the copper. Heat is then preferably applied to the receptacle until the copper is melted.

In greater detail, the method of treating copper embodying my invention comprises placing a selected amount of substantially pure copper in a suitable receptacle, such as a crucible. Sodium tetraborate (borax) in an amount approximately equal in weight to 1/192 the weight of the copper under treatment is preferably added; and ammonium chloride (sal ammoniac) in an amount approximately equal in weight to 1/192 the weight of the copper is also preferably added. Also, sodium chloride (common salt) in an amount approximately equal in weight to 1/64 the weight of the copper is preferably included.

The substances in the crucible are preferably covered with a material for preventing the copper from oxidizing. For this purpose sodium bicarbonate (baking soda) in an amount approximately equal in weight to 1/16 the weight of the copper may conveniently be employed. Heat is then preferably applied to the receptacle until the copper is melted. After this the metal is cast in suitable molds.

The resulting composition of matter is in all outward appearances like copper. Many of the physical characteristics thereof however are changed. For instance, the treated copper embodying my invention is softer and tougher than the untreated copper. Also, the treated copper may be heated to low red heat and forged, and may be readily machined with ordinary tools. In addition, the treated copper has a lower coefficient of thermal expansion than the untreated copper. Furthermore, the improved form of copper does not scale, and will take a high glass-like glaze. Still further, the treated copper of my invention does not harden or crystallize under working.

The treated form of copper embodying my invention is particularly useful as a bearing metal, and particularly for high speed work, because it has the high melting point of copper, yet is practically no harder than nickel babbitt. The other qualities which make the metal particularly useful in this connection are that the metal resists wear, does not harden or crystallize under working conditions and will not expand to tighten the bearings under the heat of friction. While this particular use of the treated copper is specifically mentioned, it is understood that it is merely for purposes of illustration. The physical characteristics of the copper embodying my invention give it merit in connection with many phases of the arts of machines and manufactures.

Very little of the function of the sodium tetraborate, ammonium chloride and sodium chloride in the treatment of copper embodying my invention is understood. It is believed however that the resulting composition is, chemically speaking, still pure copper; the changes in the physical characteristics being thought due to changes in the molecular or atomic structure of the metal.

In all likelihood a more skilled analysis of the treatment which I have discovered will reveal to those skilled in the art the functions of the specific ingredients which I have employed and disclosed. The broad conception in my invention has been the treatment of copper to alter the physical characteristics thereof as pointed out above, and it is understood that any substances equivalent in their action to the specific ingredients mentioned may be employed.

I claim:

1. The method of treating copper which comprises melting the copper in the presence of sodium tetraborate, ammonium chloride and sodium chloride.

2. The method of treating copper which comprises melting the copper in the presence of sodium tetraborate in an amount approximately equal in weight to 1/192 the weight of the copper, ammonium chloride in an amount approximately equal in weight to 1/192 the weight of the copper, and sodium chloride in an amount approximately equal in weight to 1/64 the weight of the copper.

3. The method of treating copper which comprises placing a selected amount of substantially pure copper in a receptacle, together with sodium tetraborate in an amount approximately equal in weight to 1/192 the weight of the copper, ammonium chloride in an amount approximately equal in weight to 1/192 the weight of the copper, and sodium chloride in an amount approximately equal in weight to 1/64 the weight of the copper, and then applying heat to the receptacle until the copper is melted.

4. The method of treating copper which comprises placing a selected amount of substantially pure copper in a receptacle, together with sodium tetraborate in an amount approximately equal in weight to 1/192 the weight of the copper, ammonium chloride in an amount approximately equal in weight to 1/192 the weight of the copper, and sodium chloride in an amount approximately equal in weight to 1/64 the weight of the copper, covering the same with sodium bicarbonate, and then applying heat to the receptacle until the copper is melted.

5. The method of treating copper which comprises placing a selected amount of substantially pure copper in a receptacle, together with sodium tetraborate in an amount approximately equal in weight to 1/192 the weight of the copper, ammonium chloride in an amount approximately equal in weight to 1/192 the weight of the copper, and sodium chloride in an amount approximately equal in weight to 1/64 the weight of the copper, covering the same with sodium bicarbonate in an amount approximately equal in weight to 1/16 the weight of the copper, and then applying heat to the receptacle until the copper is melted.

6. A composition of matter comprising the result of melting copper with sodium tetraborate, ammonium chloride and sodium chloride.

7. A composition of matter comprising the result of melting a selected amount of copper with sodium tetraborate in an amount approximately equal in weight to 1/192 the weight of the copper, ammonium chloride in an amount approximately equal in weight to 1/192 the weight of the copper, and sodium chloride in an amount approximately equal in weight to 1/64 the weight of the copper.

8. A form of copper in which the physical characteristics of copper have been altered by melting the copper in the presence of sodium tetraborate, ammonium chloride and sodium chloride.

9. The method of treating copper for rendering it adaptable for use as a bearing metal, which comprises melting the copper in the presence of sodium tetraborate, ammonium chloride and sodium chloride, and preventing oxidation of the copper while it is melting.

10. The method of treating copper for rendering it adaptable for use as a bearing metal, which comprises placing the copper in a receptacle together with sodium tetraborate, ammonium chloride and sodium chloride, covering the same with a substance to prevent oxidation of the copper, and then applying heat to the receptacle until the copper is melted.

11. The method of treating copper for rendering it adaptable for use as a bearing metal, which comprises placing the copper in a receptacle together with sodium tetraborate, ammonium chloride and sodium chloride, covering the same with sodium bicarbonate, and then applying heat to the receptacle until the copper is melted.

ARTHUR D. ATKIN.